United States Patent
Hushchyn et al.

(10) Patent No.: US 10,129,476 B1
(45) Date of Patent: Nov. 13, 2018

(54) SUBJECT STABILISATION BASED ON THE PRECISELY DETECTED FACE POSITION IN THE VISUAL INPUT AND COMPUTER SYSTEMS AND COMPUTER-IMPLEMENTED METHODS FOR IMPLEMENTING THEREOF

(71) Applicants: Yury Hushchyn, Vilnius (LT); Aliaksei Sakolski, Minsk (BY)

(72) Inventors: Yury Hushchyn, Vilnius (LT); Aliaksei Sakolski, Minsk (BY)

(73) Assignee: Banuba Limited, Wan Chai (HK)

( * ) Notice: Subject to any disclaimer, the term of this patent is extended or adjusted under 35 U.S.C. 154(b) by 0 days.

(21) Appl. No.: 15/962,347

(22) Filed: Apr. 25, 2018

Related U.S. Application Data

(60) Provisional application No. 62/490,433, filed on Apr. 26, 2017.

(51) Int. Cl.
- *H04N 5/232* (2006.01)
- *G06K 9/00* (2006.01)
- *G06T 7/246* (2017.01)

(52) U.S. Cl.
CPC ..... *H04N 5/23254* (2013.01); *G06K 9/00228* (2013.01); *G06T 7/248* (2017.01); *H04N 5/23267* (2013.01); *G06T 2207/30201* (2013.01)

(58) Field of Classification Search
CPC ............ H04N 5/23254; H04N 5/23267; G06T 7/248; G06T 2207/30201; G06K 9/00228
See application file for complete search history.

(56) References Cited

U.S. PATENT DOCUMENTS

| | | |
|---|---|---|
| 2009/0160952 A1 | 6/2009 | Nakakuki et al. |
| 2011/0141219 A1 | 6/2011 | Yeh |
| 2014/0185924 A1* | 7/2014 | Cao ................... G06K 9/00281 382/159 |
| 2015/0169938 A1 | 6/2015 | Yao et al. |

OTHER PUBLICATIONS

Belhumeur et al., "Localizing Parts of Faces Using a Consensus of Exemplars", CVPR '11 Proceedings of the 2011 IEEE Conference on Computer Vision and Pattern Recognition, pp. 545-552, 2011.
Dollar et al., "Cascaded Pose Regression", California Institute of Technology, pp. 1078-1085, 2010.
(Continued)

*Primary Examiner* — Twyler Haskins
*Assistant Examiner* — Fayez Bhuiyan
(74) *Attorney, Agent, or Firm* — Greenberg Traurig, LLP

(57) ABSTRACT

In some embodiments, the present invention provides for an exemplary computer system that may include: a camera component configured to acquire a visual content, wherein the visual content having a plurality of frames with a visual representation of a face of a person; a processor configured to: apply, for each frame, a multi-dimensional face detection regressor for fitting at least one meta-parameter to detect or to track a plurality of multi-dimensional landmarks representative of a face; apply a face movement detection algorithm to identify each displacement of each respective multi-dimensional landmark between frames; and apply a face movement compensation algorithm to generate a face movement compensated output that stabilizes the visual representation of the face.

16 Claims, 3 Drawing Sheets

(56) References Cited

OTHER PUBLICATIONS

Le et al., "Interactive Facial Feature Localization", ECCV'12 Proceedings of the 12th European conference on Computer Vision—vol. Part III, pp. 679-692, 2012.
Liao et al., "Unconstrained Face Detection", pp. 1-14.
Ren et al., "Face Alignment at 3000 FPS via Regressing Local Binary Features", Computer Vision and Pattern Recognition (CVPR), 2014 IEEE Conference, pp. 1-8, 2014.
Sagonas et al., "A semi-automatic methodology for facial landmark annotation", 2013 IEEE Conference on Computer Vision and Pattern Recognition Workshops, pp. 896-903, 2013.
Viola et al., "Rapid Object Detections using a Boosted Cascade of Simple Features", Accepted Conference on Computer Vision and Pattern Recognition 2001.
Xiong et al., "Supervised Descent Method and its Applications to Face Alignment", Computer Vision and Pattern Recognition (CVPR), 2013 IEEE Conference, pp. 532-539, 2013.
International Search Report and Written Opinion from International Application No. PCT/IB2018/000502 dated Sep. 12, 2018.

\* cited by examiner

SUBJECT STABILISATION BASED ON THE PRECISELY DETECTED FACE POSITION IN THE VISUAL INPUT AND COMPUTER SYSTEMS AND COMPUTER-IMPLEMENTED METHODS FOR IMPLEMENTING THEREOF

CROSS-REFERENCE TO RELATED APPLICATIONS

This application claims benefit of U.S. provisional patent application Ser. No. 62/490,433 filed Apr. 26, 2017, which is herein incorporated by reference for all purposes.

FIELD OF THE INVENTION

Generally the present disclosure is directed to subject stabilisation based on the precisely detected face position in the visual input, and computer systems and computer-implemented methods for implementing thereof.

BACKGROUND

Detecting and tracking a human face present within a visual input is an important aspect of applications associated with portable electronic devices.

SUMMARY OF THE INVENTION

In some embodiments, the present invention provides for an exemplary computer-implemented method that may include at least the following steps of: obtaining, by at least one processor, a plurality of frames having a visual representation of a face of at least one person; applying, by the at least one processor, for each frame, at least one multi-dimensional face detection regressor for fitting at least one meta-parameter to detect or to track a plurality of multi-dimensional landmarks that are representative of a presence of a face of at least one person in each respective frame; applying, by the at least one processor, for each frame in the plurality of frames, at least one face movement detection algorithm to identify each displacement of each respective multi-dimensional landmark of the plurality of multi-dimensional landmarks between frames; applying, by the at least one processor, for each frame in the plurality of frames, at least one face movement compensation algorithm to generate a face movement compensated output that stabilizes the visual representation of the face of the at least one person; where the face movement compensated output includes a plurality of face movement compensated frames that has been identified from the plurality of frames; and where the plurality of face movement compensated frames includes at least one of: 1) a subset of first-type face movement compensated frames that has been identified from the plurality of frames by the least one face movement compensation algorithm, where each first-type face movement compensated frame include at least one respective multi-dimensional landmark of the plurality of multi-dimensional landmarks whose displacement between at least two first-type face movement compensated frames does not exceed a pre-determined threshold value; and 2) a plurality of second-type face movement compensated frames that has been generated from the plurality of frames by the least one face movement compensation algorithm, where the plurality of second-type face movement compensated frames includes at least one frame in which the face of the at least one person has been re-drawn so as to reduce any displacement of the at least one respective multi-dimensional landmark of the plurality of multi-dimensional landmarks between the at least two frames whose current value exceeds the pre-determined threshold value to a new value that is less than the pre-determined threshold value.

In some embodiments, the plurality of frames is part of a video stream. In some embodiments, the video stream is a real-time video stream. In some embodiments, the real-time video stream is a live video stream. In some embodiments, the pre-determined threshold value is between 1 Hz and 20 Hz. In some embodiments, the pre-determined threshold value is between 10 Hz and 20 Hz.

In some embodiments, the method may further include: applying, by the at least one processor, at least one visual encoding algorithm to transform the plurality of face movement compensated frames into a visual encoded output.

In some embodiments, the at least one visual encoding algorithm includes a perceptual coding compression based on a human visual system model to remove a perceptual redundancy.

In some embodiments, prior to the applying the at least one face movement compensation algorithm, the method may further include: separating, by the at least one processor, the face of the at least one person from a background based on utilizing at least one deep learning algorithm.

In some embodiments, the plurality of frames is obtained by a camera of a portable electronic device and where the at least one processor is a processor of the portable electronic device.

In some embodiments, the present invention provides for an exemplary computer system that may include at least the following components: a camera component, where the camera component is configured to acquire a visual content, where the visual content includes a plurality of frames having a visual representation of a face of at least one person; at least one processor; a non-transitory computer memory, storing a computer program that, when executed by the at least one processor, causes the at least one processor to: apply, for each frame of the plurality of frames, at least one multi-dimensional face detection regressor for fitting at least one meta-parameter to detect or to track a plurality of multi-dimensional landmarks that are representative of a presence of a face of at least one person in each respective frame; apply, for each frame in the plurality of frames, at least one face movement detection algorithm to identify each displacement of each respective multi-dimensional landmark of the plurality of multi-dimensional landmarks between frames; apply, for each frame in the plurality of frames, at least one face movement compensation algorithm to generate a face movement compensated output that stabilizes the visual representation of the face of the at least one person; where the face movement compensated output includes a plurality of face movement compensated frames that has been identified from the plurality of frames; and where the plurality of face movement compensated frames includes at least one of: 1) a subset of first-type face movement compensated frames that has been identified from the plurality of frames by the least one face movement compensation algorithm, where each first-type face movement compensated frame include at least one respective multi-dimensional landmark of the plurality of multi-dimensional landmarks whose displacement between at least two first-type face movement compensated frames does not exceed a pre-determined threshold value; and 2) a plurality of second-type face movement compensated frames that has been generated from the plurality of frames by the least one face movement compensation algorithm, where the plurality of second-type face movement compensated frames includes at least one frame in which the face of the at least one person has been re-drawn so as to reduce any displacement of the at least one respective multi-dimensional landmark of the plurality of multi-dimensional landmarks between the at least two frames whose current value exceeds the pre-determined threshold value to a new value that is less than the pre-determined threshold value.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

Figure 1:
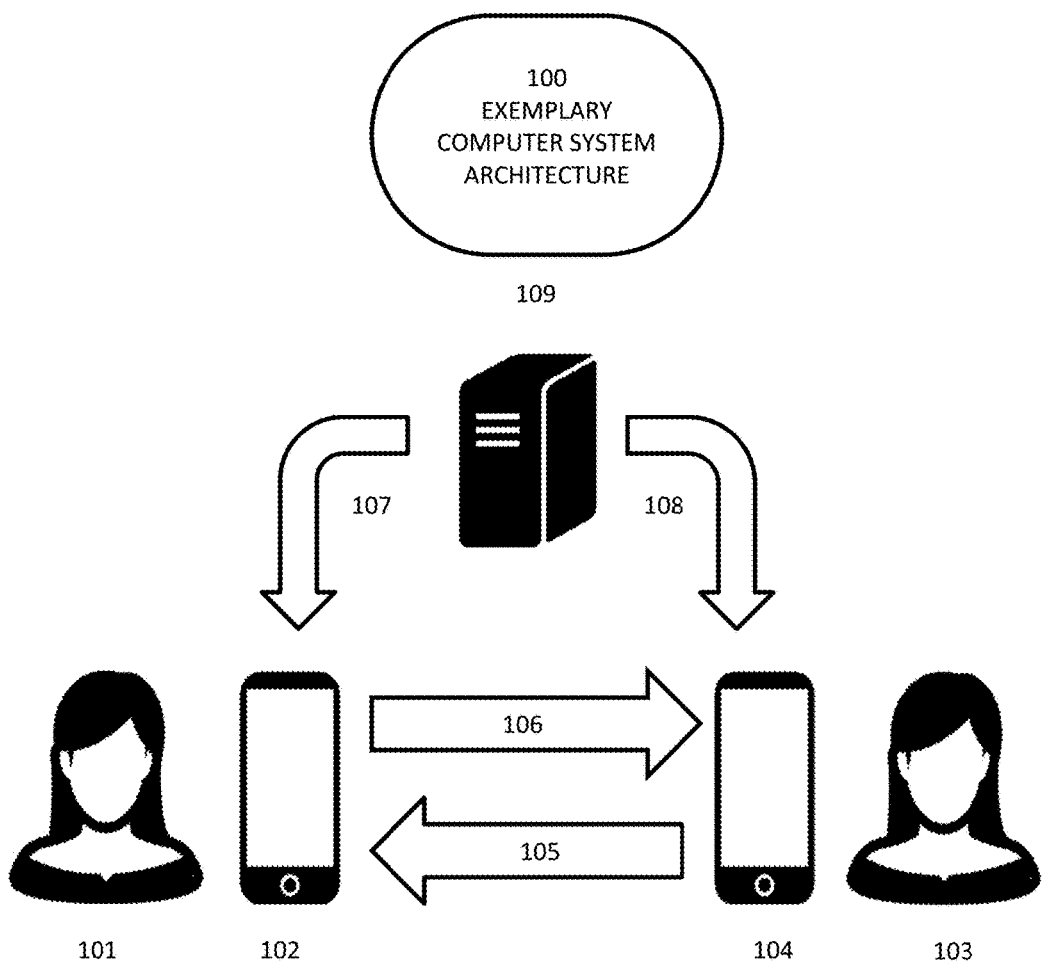
FIGS. 1-3 are representative of some exemplary aspects of the present invention in accordance with at least some principles of at least some embodiments of the present invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DESCRIPTION OF EXEMPLARY EMBODIMENTS

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the present invention is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention. Further, when a particular feature, structure, or characteristic is described in connection with an implementation, it is submitted that it is within the knowledge of one skilled in the art to effect such feature, structure, or characteristic in connection with other implementations whether or not explicitly described herein.

The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, the inventive specially programmed computing systems with associated devices are configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object oriented programming), and the type of computer programming languages that may be used (e.g., C++, Objective-C, Swift, Java, Javascript). The aforementioned examples are, of course, illustrative and not restrictive.

As used herein, the terms "image(s)" and "image data" are used interchangeably to identify data representative of visual content which includes, but not limited to, images encoded in various computer formats (e.g., ".jpg", ".bmp," etc.), streaming video based on various protocols (e.g., Real-time Streaming Protocol (RTSP), Real-time Transport Protocol (RTP), Real-time Transport Control Protocol (RTCP), etc.), recorded/generated non-streaming video of various formats (e.g., ".mov," ".mpg," ".wmv," ".avi," ".flv," etc.), and real-time visual imagery acquired through a camera application on a mobile device.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

As used herein, the term "user" shall have a meaning of at least one user.

For example, FIG. 1 illustrates an exemplary computer system environment 100 incorporating certain embodiments of the present invention. As shown in FIG. 1, the exemplary environment 100 may include a first user 101, who may use a mobile device 102 to communicate with a second user 103, having a mobile device 104. FIG. 1 also illustrates that the exemplary computer system environment 100 may incorporate an exemplary server 109 which is configured to operationally communicate with the mobile devices 102 and 104. In some embodiments, other devices may also be included. For example, in some embodiments, the mobile devices 102 and 104 may be any appropriate type of mobile devices, such as, but not limited to, smartphones, or tablets. Further, the mobile devices 102 and 104 may be any appropriate devices capable of taking images and/or video via at least one camera. Further, the exemplary server 109 may include any appropriate type of server computer or a plurality of server computers for providing suitable technological ability to perform external calculations and/or simulations in order to improve models that may be used in mobile application(s) programmed in accordance with one or more inventive principles of the present invention. In some embodiments, the exemplary server 109 may be configured to store users' data and/or additional content for respective applications being run on users' associated mobile devices.

For example, in some embodiments, the users 101 and 103 may interact with the mobile devices 102 and 104 by means of 1) application control(s) and 2) front and/or back camera(s). Each user may be a single user or a plurality of users. In some embodiments, the exemplary mobile devices 102/104 and/or the exemplary server 109 may be implemented on any appropriate computing circuitry platform as detailed herein.

In some embodiments, the inventive methods and the inventive systems of the present inventions can be incorporated, partially or entirely, into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some examples, visual input data associated with the first user may be captured via an exemplary camera sensor-type imaging device of the mobile device 102 or the like (e.g., a complementary metal oxide-semiconductor-type image sensor (CMOS), a charge-coupled device-type image sensor (CCD)), without the use of a red-green-blue (RGB) depth camera and/or microphone-array to locate who is speaking. In other examples, an RGB-Depth camera and/or microphone-array might be used in addition to or in alternative to the camera sensor. In some examples, the exemplary imaging device of the mobile device 102 may be provided via either a peripheral eye tracking camera or as an integrated a peripheral eye tracking camera in backlight system 100.

In some embodiments, as shown in FIG. 1, processed and encoded video inputs may be (105) and (106). In some embodiments, the exemplary server (109) can be configured to generate a synthetic morphable face database (an exemplary morphable face model) with predefined set of meta-parameters and train at least one inventive machine learning algorithm of the present invention based, at least in part, on the synthetic morphable face database to obtained the trained face detection machine learning algorithm of the present invention. In some embodiments, the exemplary server (109) can be configured to generate the exemplary synthetic face database which can include 3D synthetic faces based on or derived from the FaceGen library (https://facegen.com) by Singular Inversions Inc. (Toronto, CA) and/or generated by, for example, utilizing the Unity3D software (Unity Technologies ApS, San Francisco, Calif.); or using other similar techniques and/or software.

In some embodiments, the exemplary server (109) may be further configured to utilize one of machine learning models/techniques (e.g., decision trees, boosting, support-vector machines, neural networks, nearest neighbor algorithms, Naive Bayes, bagging, random forests, etc.), face alignment models/techniques, and the 3D morphable facial models/techniques, such as, but not limited to, respective types of models and/or techniques provided in U.S. patent application Ser. No. 15/881,353 which is incorporated herein by reference for at least this specific purpose.

In some embodiments, during the face detection task, the exemplary server (109) may be specifically configured to improve the face model in a cascaded manner where an exemplary regression model would consequentially update the previous face model into a new one with varied parameters of regressors at each cascade. In some embodiments, the exemplary illustrative methods and the exemplary illustrative systems of the present invention are specifically configured to utilize regression models, or regressors, that apply a combination of at least two or more machine learning algorithms (e.g., a combination of random forest and linear regression) that use, for example but no limiting to, local binary features to predict increments in latent variables (or any other suitable variables, like 2D or 3D landmark points).

In some embodiments, an optimal choice of a set of regressor parameters at each cascade may be achieved by using distributed asynchronous hyperparameter processing and including a penalty constraint to the loss function while training the model by predicting a shape increment and applying the predicated shape increment to update the current estimated shape of the face in the next sequential frame as, for example, provided in U.S. patent application Ser. No. 15/881,353 which is incorporated herein by reference for at least this specific purpose. For example, if N is a number of trees in random forest algorithm, D is a tree depth, L is a number of facial landmarks, and C is a number of cascades, an exemplary configuration may be: D=[3, 3, 3, 3, 3, 3, 3], D=[2, 4, 7, 6, 7, 7, 12], L=68, where array sizes are equal to the exemplary number of cascades.

In some embodiments, the exemplary server (109) may be further configured to generate and/or populate at least one database by rendering textured face models and determining, for example, face features/landmarks with predefined set of parameters such as, but not limited to: three-dimensional angles, translates, light vector coordinates, hair styles, beards, anthropometric parameters, facial expressions (e.g., anger, joy, etc.), and suitable others. For example, face models may be defined based on a set of facial landmarks where each landmark may be further defined based on a plurality of facial points where each face point may be further defined by the set of parameters such as, but not limited to: three-dimensional angles, translates, light vector coordinates, hair styles, beards, anthropometric parameters, facial expressions (e.g., anger, joy, etc.), and suitable others.

In some embodiments, the exemplary server (109) may be further configured/programmed to cause an exemplary face detection/tracking regressor (i.e., regression function) to be preliminarily trained based on at least one synthetic face model training set/database, and then utilize the preliminary trained combined cascaded regressor to obtain at least one exemplary synthetic face training model. In one example, the exemplary combined cascaded regressor may belong to a class of 3D morphable face models and may be based on a combination of machine learning algorithms (e.g. random forest+linear regression, etc.).

In some embodiment, the exemplary training may be performed by a client application residing on the respective user's mobile device and/or at the exemplary remote server (109).

In some embodiments, the exemplary implementation of the present invention can be a C++ implementation of a command-line tool/application that can be run, for example, on the exemplary server (109). In some embodiments, the exemplary illustrative methods and the exemplary illustrative systems of the present invention are specifically configured to generate all parameter sets (e.g., larger ranges of tilt, roll, pan angles, etc.). In some embodiments, the train data can be in the form of a database of images coupled with description files. In some embodiments, the exemplary server (109) is configured to transmit, via 107 and 108 data transmissions, at least one face recognition trained model to the mobile devices 102 and 104.

Figure 2:
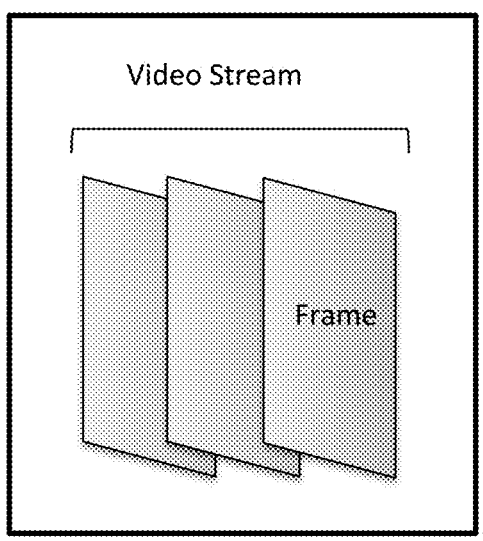

In some embodiments, the input image data (e.g., input video data) may include any appropriate type of source for video contents and may contain various video sources. In some embodiments, the contents from the input video (e.g., the video stream of FIG. 2) may include both video data and metadata. Plurality of frames may be associated with the video contents and may be provided to other modules for processing. A single picture may also be included in a frame. As shown in FIG. 2, an exemplary input video stream captured by the exemplary camera (e.g., a front camera of a mobile personal smartphone) can be divided into frames. For example, a typical movie sequence is an interleaved format of a number of camera shots, and a camera take is a continuous recorded performance with a given camera setup. Camera registration, as used herein, may refer to registration of different cameras capturing video frames in a video sequence/stream. The concept of camera registration is based on the camera takes in reconstruction of video edits. A typical video sequence is an interleaved format of a number of camera shots, and a camera take is a continuous recorded performance with a given camera setup. By registering each camera from the incoming video frames, the original interleaved format can be separated into a number of sequences with each corresponding to a registered camera that is aligned to the original camera setup.

Figure 3:
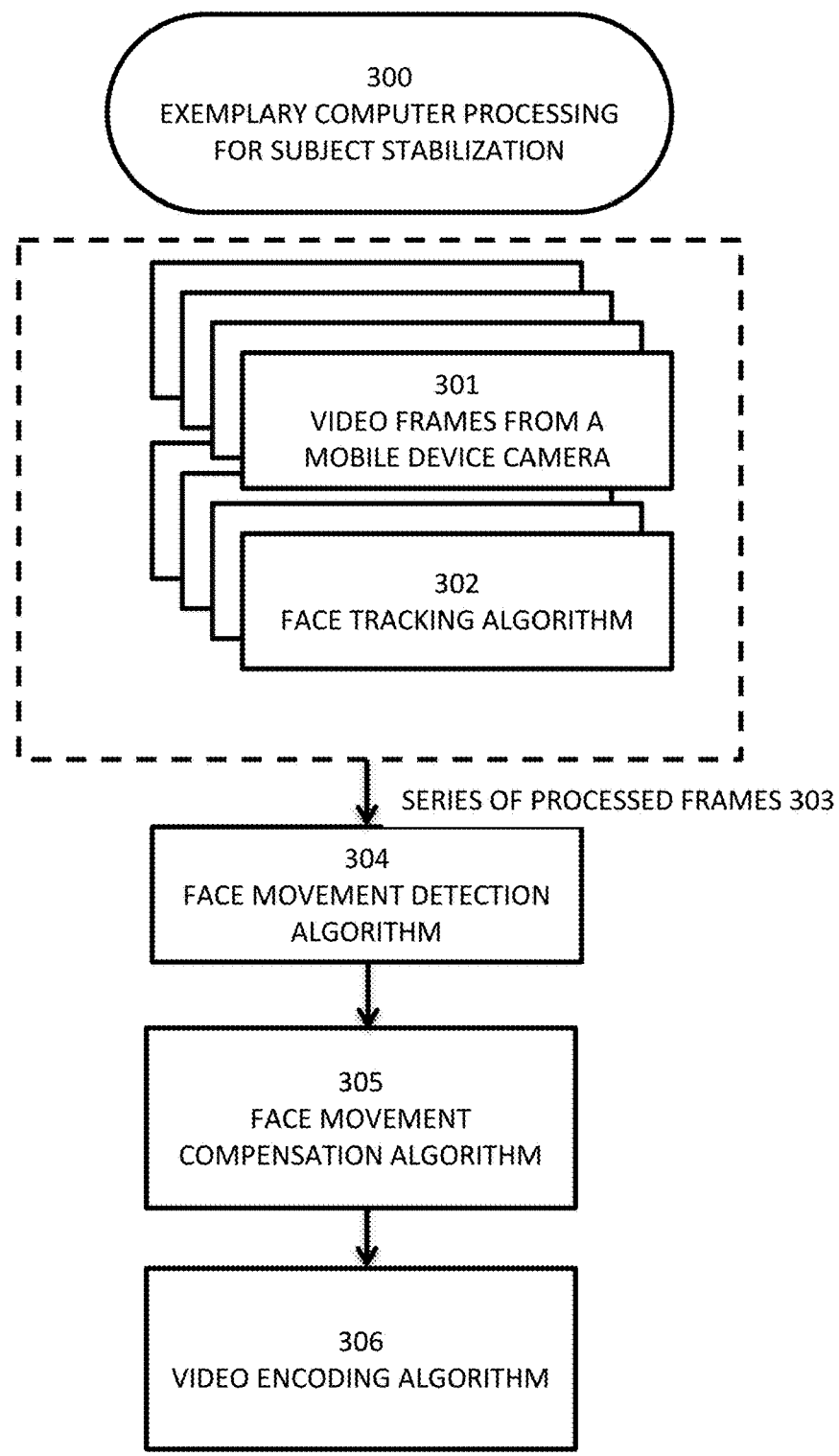

FIG. 3 illustrates an exemplary structure of an exemplary computer engine system (e.g., 100) that is programmed/configured to implement the inventive subject stabilization in accordance with at least some embodiments of the present invention. In some embodiments, at step 1, a series of frames (301), acquired by one or more mobile devices (e.g., 102, 104), are processed by at least one computer engine/processor executing an exemplary face tracking algorithm 302, which may be configured to utilize the three-dimensional morphable face model (regressor) for fitting one or more meta-parameters (for example, camera model, camera angles, light direction vector, morphs, anthropometric coefficients, rotations and translates, etc.) to identify/calculate two- and/or three-dimensional landmarks. In some embodiments, the processing of step 1 may be performed by a specifically designed client resided in each mobile device (e.g., 102 or 104) and/or by the exemplary server (109). In some embodiments, a stage 1 output (303) may be further processed the set of frames with metadata containing information about two- and/or three-dimensional landmarks and one or more meta-parameters. In some embodiments, the exemplary face tracking algorithm can be selected from one or more techniques detailed in U.S. patent application Ser. No. 15/881,353 which is incorporated herein by reference for at least this specific purpose.

TABLE 1 details a non-limiting example of the exemplary inventive face tracking algorithm.

TABLE 1

| | |
|---|---|
| 1. | Input: a database of synthetic face images; |
| 2. | Train a classifier with the following set of meta-parameters: Meta-Parameters = [Camera Model, Light Source, Anthropometric Coefficients, Face Expressions, Emotion Coefficients]; |
| 3. | Fit each image/frame taken from a video with the trained model/classifier; |

TABLE 1-continued

4. Calculate meta-parameters for the face in each frame;
5. Calculate two- and/or three-dimensional facial landmark points; and
6. Output: meta-parameters, two- and/or three-dimensional landmarks.

In some embodiments, the exemplary face tracking algorithm may be utilized together with an exemplary anti jitter algorithm which can be selected from one or more techniques detailed in U.S. patent application Ser. No. 15/881,353 which is incorporated herein by reference for at least this specific purpose.

At step 2, the exemplary computer engine system 300 is further programmed/configured to utilize an exemplary inventive face movement detection algorithm (304) to detect, for example, if at least one sharp movement of 2D/3D facial landmark(s) in the stage 1 output data (303). As used herein the term "sharp" identifies a displacement that exceeds a pre-defined threshold. In some embodiments, such pre-defined thresholds may vary in the range from 1 Hz to 20 Hz. In some embodiments, pre-defined thresholds may vary in the range from 10 Hz to 20 Hz.

If the exemplary computer engine system (300) detects the at least one sharp movement, the exemplary computer engine system (300) may be further programmed/configured to apply an exemplary inventive face movement compensation algorithm (305). In some embodiments, the exemplary computer engine system 300 is further programmed/configured to encode, at step 3, the output from the exemplary inventive face movement compensation algorithm (305) by an exemplary inventive video encoding algorithm (306). For example, the following video encoding algorithms may be used: H.264, ZRLE, VC2, H.261, H.262, H.263, MPEG4, VP9 and other similarly suitable algorithms. In some embodiments, the exemplary inventive video encoding algorithm (306) may include one or more steps of processing based on perceptual coding/lossy compression to incorporate the human visual system model in the coding framework to remove the perceptual redundancy. In some embodiments, the exemplary computer engine system 300 is further programmed/configured to perform one or more steps of the step 1-3 by additionally utilizing at least one deep learning algorithm to separate the face from a background. For example, the separation of the face and background may be performed by utilizing depth maps that may be acquired from an appropriate device that supports taking such maps or other suitable deep learning algorithm (e.g., convolutional neural network, etc.).

TABLE 2 details non-limiting examples of utilizing the exemplary inventive face movement compensation algorithm 305 and the exemplary inventive video encoding algorithm 306.

TABLE 2

Example 1

1. Input: series of frames with calculated facial landmark points in each;
2. Compare positions of the landmarks in frames. If the difference (calculated as the mean, or meadian, or quantile, etc.) exceeds a threshold, the sharp movement is detected;
3. IF no sharp movement detected, return to 1.
ELSE:
4. From the series of frames take those whose relative movements are less than the threshold;
5. Encode the video using selected frames; and
6. Output: encoded video transmitted through the communication channel (107/108).

TABLE 2-continued

Example 2

1. Input: series of frames with calculated facial landmark points in each;
2. Separate the face from a background by means of a neutral network technique (e.g., feedforward neural network, radial basis function network, recurrent neural network etc.);
3. Compare positions of the landmarks in frames: If the difference (calculated as, but not limited to, at least one of mean, meadian, quantile, other similarly suitable measure, etc.) exceeds the threshold, the sharp movement is detected;
4. IF no sharp movement detected, return to 1;
ELSE:
5. Re-draw the face, updating previous position by the value less than the threshold;
6. Encode the video;
7. Output: encoded video transmitted through a communication channel (107/108);

Further, in some embodiments, the exemplary computer engine system (300) may be programmed/configured such that some step(s) performed at the mobile devices (102, 104) and some step(s) are performed at the exemplary server (109).

In some embodiments, for example, the exemplary computer engine system (300) may include or be operationally connected to a Graphics subsystem, such as, but not limited to, a graphics processing unit (GPU) or a visual processing unit (VPU), which may perform processing of images such as still or video for display. In some embodiments, analog and/or digital interfaces may be used to communicatively couple the exemplary Graphics subsystem and a display. For example, the interface may be any of a High-Definition Multimedia Interface, DisplayPort, wireless HDMI, and/or wireless HD compliant techniques. In some embodiments, the exemplary Graphics subsystem may be integrated into a processor or a chipset. In some implementations, the exemplary Graphics subsystem may be a stand-alone card communicatively coupled to the chipset.

In some embodiments, the exemplary computer engine system (300) may communicate via one or more radios modules capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, one or more radios modules may operate in accordance with one or more applicable standards in any version.

In various implementations, the final output of the exemplary computer engine system (300) may also be displayed on a screen which may include any television type monitor or display. In various implementations, the display may include, for example, a computer display screen, touch screen display, video monitor, television-like device, and/or a television. In various implementations, the display may be digital and/or analog. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

Further, in some embodiments, the exemplary computer engine system 300 is programmed/configured, as detailed herein, to allow for a reduction of facial region shaking and minimizing communication channel capacity usage. Further, in some embodiments, the exemplary computer engine system (300) may be utilized for various applications which may include, but not limited to, gaming, mobile-device games, video chats, video conferences, live video streaming, video streaming and/or augmented reality applications, mobile-device messenger applications, and others similarly suitable computer-device applications. Further, in some embodiments, the exemplary computer engine system 300 is programmed/configured, as detailed herein, to allow for the reduction of facial region shaking and minimizing communication channel capacity usage without utilizing built-in gyroscopes in computer devices associated with users (e.g., smartphones) to detect shaking.

In some embodiments, the present invention provides for an exemplary computer-implemented method that may include at least the following steps of: obtaining, by at least one processor, a plurality of frames having a visual representation of a face of at least one person; applying, by the at least one processor, for each frame, at least one multi-dimensional face detection regressor for fitting at least one meta-parameter to detect or to track a plurality of multi-dimensional landmarks that are representative of a presence of a face of at least one person in each respective frame; applying, by the at least one processor, for each frame in the plurality of frames, at least one face movement detection algorithm to identify each displacement of each respective multi-dimensional landmark of the plurality of multi-dimensional landmarks between frames; applying, by the at least one processor, for each frame in the plurality of frames, at least one face movement compensation algorithm to generate a face movement compensated output that stabilizes the visual representation of the face of the at least one person; where the face movement compensated output includes a plurality of face movement compensated frames that has been identified from the plurality of frames; and where the plurality of face movement compensated frames includes at least one of: 1) a subset of first-type face movement compensated frames that has been identified from the plurality of frames by the least one face movement compensation algorithm, where each first-type face movement compensated frame include at least one respective multi-dimensional landmark of the plurality of multi-dimensional landmarks whose displacement between at least two first-type face movement compensated frames does not exceed a pre-determined threshold value; and 2) a plurality of second-type face movement compensated frames that has been generated from the plurality of frames by the least one face movement compensation algorithm, where the plurality of second-type face movement compensated frames includes at least one frame in which the face of the at least one person has been re-drawn so as to reduce any displacement of the at least one respective multi-dimensional landmark of the plurality of multi-dimensional landmarks between the at least two frames whose current value exceeds the pre-determined threshold value to a new value that is less than the pre-determined threshold value.

In some embodiments, the plurality of frames is part of a video stream. In some embodiments, the video stream is a real-time video stream. In some embodiments, the real-time video stream is a live video stream. In some embodiments, the pre-determined threshold value is between 1 Hz and 20 Hz. In some embodiments, the pre-determined threshold value is between 10 Hz and 20 Hz.

In some embodiments, the method may further include: applying, by the at least one processor, at least one visual encoding algorithm to transform the plurality of face movement compensated frames into a visual encoded output.

In some embodiments, the at least one visual encoding algorithm includes a perceptual coding compression based on a human visual system model to remove a perceptual redundancy.

In some embodiments, prior to the applying the at least one face movement compensation algorithm, the method may further include: separating, by the at least one processor, the face of the at least one person from a background based on utilizing at least one deep learning algorithm.

In some embodiments, the plurality of frames is obtained by a camera of a portable electronic device and where the at least one processor is a processor of the portable electronic device.

In some embodiments, the present invention provides for an exemplary computer system that may include at least the following components: a camera component, where the camera component is configured to acquire a visual content, where the visual content includes a plurality of frames having a visual representation of a face of at least one person; at least one processor; a non-transitory computer memory, storing a computer program that, when executed by the at least one processor, causes the at least one processor to: apply, for each frame of the plurality of frames, at least one multi-dimensional face detection regressor for fitting at least one meta-parameter to detect or to track a plurality of multi-dimensional landmarks that are representative of a presence of a face of at least one person in each respective frame; apply, for each frame in the plurality of frames, at least one face movement detection algorithm to identify each displacement of each respective multi-dimensional landmark of the plurality of multi-dimensional landmarks between frames; apply, for each frame in the plurality of frames, at least one face movement compensation algorithm to generate a face movement compensated output that stabilizes the visual representation of the face of the at least one person; where the face movement compensated output includes a plurality of face movement compensated frames that has been identified from the plurality of frames; and where the plurality of face movement compensated frames includes at least one of: 1) a subset of first-type face movement compensated frames that has been identified from the plurality of frames by the least one face movement compensation algorithm, where each first-type face movement compensated frame include at least one respective multi-dimensional landmark of the plurality of multi-dimensional landmarks whose displacement between at least two first-type face movement compensated frames does not exceed a pre-determined threshold value; and 2) a plurality of second-type face movement compensated frames that has been generated from the plurality of frames by the least one face movement compensation algorithm, where the plurality of second-type face movement compensated frames includes at least one frame in which the face of the at least one person has been re-drawn so as to reduce any displacement of the at least one respective multi-dimensional landmark of the plurality of multi-dimensional landmarks between the at least two frames whose current value exceeds the pre-determined threshold value to a new value that is less than the pre-determined threshold value.

A person skilled in the art would understand that, without violating the principles of the present invention detailed herein, in some embodiments, the exemplary illustrative methods and the exemplary illustrative systems of the present invention can be specifically configured to be utilized in any combination with one or more techniques, methodologies, and/or systems detailed in U.S. patent application Ser. No. 15/881,353 which is incorporated herein by reference in its entirety for such purpose.

While a number of embodiments of the present invention have been described, it is understood that these embodiments are illustrative only, and not restrictive, and that many modifications may become apparent to those of ordinary skill in the art, including that the inventive methodologies, the inventive systems, and the inventive devices described herein can be utilized in any combination with each other. Further still, the various steps may be carried out in any desired order (and any desired steps may be added and/or any desired steps may be eliminated).

What is claimed is:

1. A computer-implemented method, comprising:
    obtaining, by at least one processor, a plurality of frames having a visual representation of a face of at least one person;
    applying, by the at least one processor, for each frame, at least one multi-dimensional face detection regressor for fitting at least one meta-parameter to detect or to track a plurality of multi-dimensional landmarks that are representative of a presence of a face of at least one person in each respective frame;
    separating, by the at least one processor, for each frame in the plurality of frames, the face of the at least one person from a background based on utilizing at least one deep learning algorithm;
    applying, by the at least one processor, for each frame in the plurality of frames, at least one face movement detection algorithm to identify each displacement of each respective multi-dimensional landmark of the plurality of multi-dimensional landmarks between frames;
    applying, by the at least one processor, for each two sequential frames in the plurality of frames, at least one face movement compensation algorithm that is configured to at least:
        i) determine that a current displacement value of at least one respective multi-dimensional landmark of the plurality of multi-dimensional landmarks between two sequential frames exceeds a pre-determined threshold value, and
        ii) re-draw the face of the at least one person for a particular frame of the two sequential frames, in which the current displacement value exceeds the pre-determined threshold value, to reduce the current displacement value of the at least one respective multi-dimensional landmark to an updated displacement value that is less than the pre-determined threshold value to generate a re-drawn face of the at least one person;
    wherein the pre-determined threshold value is between 1 and 20 Hz; and
    combining, by the at least one processor, the re-drawn face of the at least one person in the particular frame of the two sequential frames with the background to generate a face movement compensated output that stabilizes the visual representation of the face of the at least one person between the two sequential frames of the plurality of frames.

2. The method of claim 1, wherein the plurality of frames is part of a video stream.

3. The method of claim 2, wherein the video stream is a real-time video stream.

4. The method of claim 3, wherein the real-time video stream is a live video stream.

5. The method of claim 1, wherein the pre-determined threshold value is between 10 and 20 Hz.

6. The method of claim 1, wherein the method further comprising:
    applying, by the at least one processor, at least one visual encoding algorithm to transform the plurality of face movement compensated frames into a visual encoded output.

7. The method of claim 6, wherein the at least one visual encoding algorithm comprises a perceptual coding compression based on a human visual system model to remove a perceptual redundancy.

8. The method of claim 1, wherein the plurality of frames is obtained by a camera of a portable electronic device and wherein the at least one processor is a processor of the portable electronic device.

9. A system, comprising:
    a camera component, wherein the camera component is configured to acquire a visual content, wherein the visual content comprises a plurality of frames having a visual representation of a face of at least one person;
    at least one processor;
    a non-transitory computer memory, storing a computer program that, when executed by the at least one processor, causes the at least one processor to:
    apply, for each frame of the plurality of frames, at least one multi-dimensional face detection regressor for fitting at least one meta-parameter to detect or to track a plurality of multi-dimensional landmarks that are representative of a presence of a face of at least one person in each respective frame;
    separate, for each frame in the plurality of frames, the face of the at least one person from a background based on utilizing at least one deep learning algorithm;
    apply, for each frame in the plurality of frames, at least one face movement detection algorithm to identify each displacement of each respective multi-dimensional landmark of the plurality of multi-dimensional landmarks between frames;
    apply, for each two sequential frames in the plurality of frames, at least one face movement compensation algorithm that is configured to at least:
        i) determine that a current displacement value of at least one respective multi-dimensional landmark of the plurality of multi-dimensional landmarks between two sequential frames exceeds a pre-determined threshold value, and
        ii) re-draw the face of the at least one person for a particular frame of the two sequential frames, in which the current displacement value exceeds the pre-determined threshold value, to reduce the current displacement value of the at least one respective multi-dimensional landmark to an updated displacement value that is less than the pre-determined threshold value to generate a re-drawn face of the at least one person;
    wherein the pre-determined threshold value is between 1 and 20 Hz; and
    combine the re-drawn face of the at least one person in the particular frame of the two sequential frames with the background to generate a face movement compensated output that stabilizes the visual representation of the face of the at least one person between the two sequential frames of the plurality of frames.

10. The system of claim 9, wherein the plurality of frames is part of a video stream.

11. The system of claim 10, wherein the video stream is a real-time video stream.

12. The system of claim 11, wherein the real-time video stream is a live video stream.

13. The system of claim 9, wherein the pre-determined threshold value is between 10 and 20 Hz.

14. The system of claim 9, wherein the at least one processor is further configured to:
   apply at least one visual encoding algorithm to transform the plurality of face movement compensated frames into a visual encoded output.

15. The system of claim 14, wherein the at least one visual encoding algorithm comprises a perceptual coding compression based on a human visual system model to remove a perceptual redundancy.

16. The system of claim 9, wherein the plurality of frames is obtained by a camera of a portable electronic device and wherein the at least one processor is a processor of the portable electronic device.

* * * * *